Jan. 31, 1933. C. G. MEMMINGER ET AL 1,896,006
PRODUCTION OF PHOSPHORIC ACID
Filed March 7, 1930
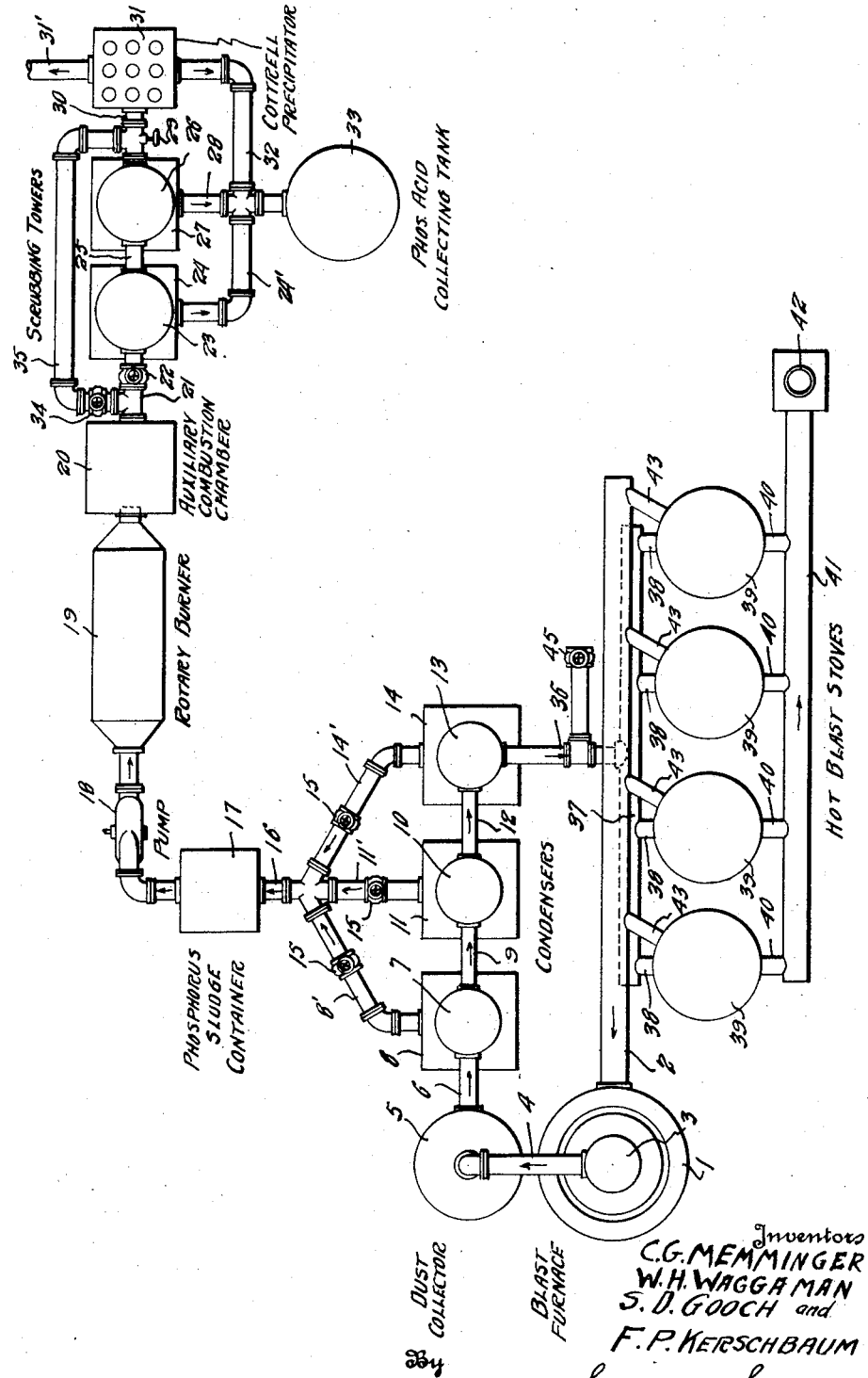
Inventors
C. G. MEMMINGER
W. H. WAGGAMAN
S. D. GOOCH and
F. P. KERSCHBAUM
By Semmes & Semmes
Attorneys Patented Jan. 31, 1933

1,896,006

UNITED STATES PATENT OFFICE

CHRISTOPHER G. MEMMINGER, OF ASHEVILLE, NORTH CAROLINA, AND WILLIAM H. WAGGAMAN, OF LAKELAND, STAPLETON D. GOOCH, OF LAKE WALES, AND FRIEDRICH P. KERSCHBAUM, OF WINTER HAVEN, FLORIDA

PRODUCTION OF PHOSPHORIC ACID

Application filed March 7, 1930. Serial No. 434,142.

This method relates to the production of phosphoric acid and more particularly to a pyrolytic method of producing phosphoric acid.

Heretofore two general processes of preparing phosphoric acid by the pyrolytic method have been employed. In the first of these elemental phosphorus is produced either in an electric or blast furnace of standard type by heating mixtures of phosphatic material, silica or silicates with a reducing agent such as coal, coke or other carbonaceous material to a smelting temperature and condensing the evolved elemental phosphorus either in water or by some other means. In this type of process the phosphorus which is collected is periodically removed and purified. The purified phosphorus is subsequently burned either in liquid or solid form in a suitable combustion chamber and the resultant $P_2O_5$ collected either in an absorption system or in a Cottrell precipitator.

The production of phosphoric acid from phosphatic materials in this manner is relatively protracted and expensive because of the fact that it involves two segregated and distinct processes and the extra handling and purification steps.

A second method in common practice involves the combustion of the various gases containing the phosphorus vapor directly within the furnace itself or in an auxiliary equipment connected with the furnace. The products of combustion, including $P_2O_5$, are passed through absorbing towers or a Cottrell precipitator as in the first type of process.

This second method, which may be considered a one-step process, presents serious disadvantages. In the first place, the dust and fumes which are carried over from the furnace tend to clog any heat regenerative or recuperative apparatus.

Secondly, the $P_2O_5$ which is formed by oxidation of the phosphorus attacks the fire brick and forms a glaze over its surface, thereby minimizing their heat absorptive capacity. Again, since the furnace gases contain phosphorus vapor and fluorine compounds, in addition to carbon monoxide, their full thermal value can not be utilized in the generation of power because of the corrosive effect of phosphoric acid and the acids of fluorine which are present.

In short, in the second method the apparatus is subjected to the deleterious effects of corrosive agents.

A major object of the invention is to provide a continuous process of producing phosphoric acid.

Another object is to devise a process of producing phosphoric acid by the pyrolytic method while utilizing substantially the full thermal values of the gaseous products.

Another object is to devise a process for continuously producing phosphoric acid in which rehandling of the materials is eliminated.

A further object is to provide a process of producing phosphoric acid by the pyrolytic method in which the maximum recovery of phosphorus is secured.

Yet another object is to provide a process for producing phosphoric acid by the pyrolytic method in which the step of purifying elemental phosphorus is eliminated.

An additional object is to provide a process for producing phosphoric acid in which the combustible materials derived from the treatment are substantially deleted of corrosive values so as to adapt such materials for use as fuel in conventionally constructed heating units.

Another object of the invention is to provide a novel method of producing elemental phosphorus for use in the production of phosphoric acid.

With these and equally other important objects in view the invention comprehends the idea of producing elemental phosphorus by smelting a specially prepared charge of phosphatic material, subjecting the evolved gaseous materials to a scrubbing action to remove from such materials the solid particles and/or potentially corrosive values to secure a non-corrosive fuel, and continuously treating the separated residue to obtain phosphoric acid of optimum purity and strength. In its preferred embodiments, the invention includes the step of recycling the purified gases to elements of the generating system to provide fuel therefor.

In order to enable a more ready comprehension of the invention a preferred embodiment of it is illustrated in the accompanying drawing. This illustration comprises a flow sheet illustrating the apparatus in conventionalized form.

The present process, considered generally, comprises the following steps: The preparation and charging of a special charge of phosphatic material to a blast furnace of novel design; the smelting of this charge in the furnace by means of a blast of air preheated by a fuel derived in the process; the condensation and removal, from the evolved furnace gases, of volatilized phosphorus concomitantly with solid fumes, fluorine compounds, and any other normally solid materials; the charging of a sludge containing the separated solids directly to a combustion zone; the ignition of the phosphorus content of the sludge to oxidize it to phosphorus pentoxide and the conversion of the evolved pentoxide into phosphoric acid by utilization of the water contained in the sludge.

It will be appreciated that this novel combination of steps presents a simple and economical method of continuously producing relatively pure phosphoric acid from raw materials. In the first place, inasmuch as it constitutes a once through method, it represents economies in manipulative time and personnel. Since the treatment produces a combustible gas substantially free from corrosive values, it affords a fuel which may be employed in any conventional inexpensive heating system. Furthermore, this gaseous fuel is not only free from corrosive values, but is also clarified since the solid particles which tend to clog the heat regenerative apparatus or other heating systems, have been substantially completely removed.

It will be appreciated that the general procedure outlined may be effectuated by employing a number of specifically different correlated steps and utilizing different apparatus.

To more clearly explain the invention, a specific method of and apparatus for securing the improved results will be described, but it will be understood that these are given merely as illustrative of the equivalent methods and means of effectuating the general principles involved. In carrying out the process a special porous charge of phosphatic material is first prepared. This may be made up by mixing properly proportioned quantities of phosphatic material and silica or silicates. The phosphatic material may be either natural phosphate rock or pebble phosphate, either washed or unwashed, "run of mine" phosphate containing the usual impurities or waste material that is washed away in preparing a higher grade rock; or finally, the phosphatic charge may include any mixture of these materials. If the phosphatic material does not contain enough silica or silicate, an additional amount may be added to provide the proper ratio of the two. The phosphate-silica mixture is then crushed and heated in a suitable apparatus to provide a sintered product in the nature of a vesicular clinker.

As shown in the drawing the prepared phosphatic material is charged to the blast furnace 1, together with coal, coke, or other carbonaceous material. This furnace is of special design being considerably higher than blast furnaces ordinarily employed in pyrolytic methods. We prefer to use a furnace the height of which from the hearth to the stock line bears a ratio to the diameter of the crucible of at least seven and one-half to one. This furnace structure, in conjunction with the utilization of a light sintered charge, enables a high heat absorption efficiency.

The large surface area provided by the porous charge and the elongated column of stock insures a protracted time and extended area of contact for the hot gases. Furthermore, the porous nature of the charge insures a high permeability which permits free passage of the gases. Finally, it will be appreciated that the column of stock acts as an efficient filtering medium to remove dust and fumes.

The hot air blast entering from the pipe 2 and through the tuyères, is preheated to 1400° F., more or less, to insure, immediately at the tuyères, and in the bosh directly above, a temperature which is sufficiently high to decompose the phosphate and evolve the phosphorus content as elemental phosphorus. As is known, due to the smelting action, a fluid, siliceous slag, is produced. This slag may be tapped off continuously or at regular intervals through a discharge opening provided in the lower part of the furnace crucible. It will be understood that the actual materials used in the construction of the furnace may be those generally employed. The furnace is provided with a plurality of tuyères (not shown) positioned in the base.

The gaseous products evolved during the smelting pass overhead, through the line 4, to the dust collector 5. This element may be of any desired construction and design. In its passage through the dust collector, the heavier dust particles entrained in the gaseous stream are separated out.

The partially clarified gaseous stream then passes from the dust collector through the line 6 to a series of condensing towers. The gas enters the first condenser 7 at a point adjacent the lower section and passes upwardly through the tower and then is discharged through the pipe 9 to a second condenser of the series. The condenser is provided, in its upper section, with any suitable type of liquid dispersing element such as a spray head. In operation water is sprayed in at the top of the tower and intimately contacts with the upwardly percolating gases so as to provide for a thorough scrubbing action. The scrubbing may be rendered more efficient by providing the condenser with any suitable type of area increasing elements, such as baffles, inert packing, down comers and risers, or any equivalent type of structure.

In carrying out the operation the washwater in the condenser is preferably continuously recirculated so as to obtain the optimum condensation and separation of phosphorus. Preferably this water is maintained at a temperature of between 100° and 140° F. This temperature is maintained so that the phosphorus which is separated out may be deposed in relatively large particles so as to insure rapid settling. It will be understood that if desired any suitable method of accelerating the precipitation of phosphorus may be employed. Thus, for example, a suitable electrolyte may be dissolved in the washwater so as to increase the quantum of precipitant thrown down from the suspension. Similarly, any other suitable method of increasing the speed of separation of the phosphorus and/or agglomerating or otherwise increasing the particle size may be availed of.

The washwater, as noted above, flows downwardly through the condenser in direct contact with the upwardly flowing gas. During this treatment a certain amount of the phosphorus is separated out, together with dust particles. The separated solids collect in the form of a sludge in the base 8 of the condenser and flows thence, either intermittently or continuously, through the discharge line 8' controlled by the valve 15 to a common header 16 and thence to a phosphorus sludge container 17.

The gases issuing from the first condenser 7 are similarly treated in a second condenser 10. In this second condenser of the series the upwardly flowing gases are sprayed with washwater maintained at a medium temperature, that is to say between 65° and 100° F. In this manner, a large portion of the phosphorus which issued from the condenser 7 in the form of a vapor is precipitated or condensed out at the lower temperature in the second condenser. The washing fluid, as noted above, may be specially chosen so as to insure the precipitation of relatively large particles. The phosphorus sludge collecting in the base 11 of the condenser passes through the valve controlled line 11' and header 16 to the sludge container 17.

After treatment in the second condenser the gases pass through the line 12 into the final condenser 13. This apparatus may be similar to the first two condensers of the series or may be a scrubber of the Feld type. In this element they are scrubbed with cold water maintained at a temperature of between 32° to 65° F. so as to remove the balance of the phosphorus which still exists in the vapor phase. The vapor pressure of the phosphorus in the last condenser is so small that after being contacted with water maintained at a low temperature substantially all is condensed out.

The gas flowing out of the final condenser, therefore comprises a gaseous mixture of carbon monoxide and diluent gaseous elements from which the phosphorus, fluorine compounds, dust and fumes have been substantially completely removed. This effluent gas, therefore, may be employed, as pointed out more fully hereinafter, as a clean, non-corrosive fuel, utilizable in the heating units of the system, or for other purposes.

The impure phosphorus sludge collecting in the base 14 of the final condenser is conducted through the valve line 14' and header 16 to the main sludge container 17. From the container 17 the aqueous sludge may be forced either continuously or intermittently from this element to a suitable combustion zone.

It will be appreciated that the treatment with the washwater involves broadly the simultaneous condensation and removal from the furnace gas of all of the normally solid components of the gas. This is done, as explained, by means of subjecting the furnace gases to a condensing action at successively lowered temperatures so as to insure a complete removal of the phosphorus in the optimum size. While the condensing system has been described as comprehending three separate elements, it will be understood that the step of condensation is not limited exclusively to such apparatus. It is within the scope of the invention, for example, to carry out this condensation or separation in a single container made up of a plurality of separate sections in which a thermal differential of the condensing fluid is maintained. This step is, therefore, broadly descriptive of any method by which the phosphorus is separated out by selective condensation by differential and controlled thermal conditions.

As shown in the drawing, the sludge is drawn off by means of the pump 18 and forced into a rotary burner 19. These two elements, it will be understood, represent any method of transferring the sludge to a separate combustion zone. If desired, the sludge may be forced from the container to the combustion zone under a gravity head, or by any other suitable method.

The sludge or pulp of the impure phosphorus is forced into the combustion zone as represented by the rotary burner 19 and is there contacted with a draft of air which preferably is admitted through the same opening through which the sludge enters.

As the rotary burner revolves the wet phosphorus is carried up on the side walls thereof and is exposed to the air draft. In these circumstances the phosphorus is burnt completely to form phosphorus pentoxide. Due to the heat of combustion, the water of the sludge is vaporized and is intimately contacted with the phosphorus pentoxide. In these circumstances, the sludge furnishes at least part of the water required to humidify the $P_2O_5$ and convert it into phosphoric acid.

If desired, there may be associated with the rotary burner an auxiliary combustion chamber represented generally by the element 20, the function of which is to insure the complete oxidation of the phosphorus.

This method of preparing an aqueous sludge of impure phosphorus presents a novel method of preparing phosphoric acid. A simple calculation will show that even where the phosphorus contains as high as 65% of moisture, the water present is sufficient only to produce strong phosphoric acid (75%).

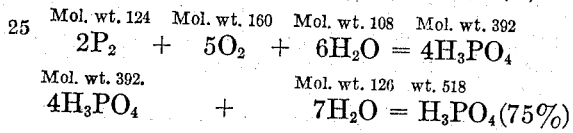

The phosphorus pentoxide and water vapors produced by this method are then led through the line 21, controlled by the valve 22, successively through the scrubbing towers 23 and 26. In these towers the vapors produced, issuing from the combustion zone, are subjected to a countercurrent wash with a suitable absorbent agent such as phosphoric acid or other mineral acids. The phosphoric acid absorbed in the tower 23 flows to the base 24 and thence through the draw off line 24' to the collecting tank 33. The vapors uncondensed in the tower 23 pass over through the line 25 to the tower 26 where they are subjected to direct contact with the absorbing agent.

The absorbed phosphoric acid collected in the base 27 of the tower passes off through the draw off line 28 to the collecting tank 33. If desired, to insure the complete removal of the formed phosphoric acid, other scrubbing towers may be connected in series with the towers 23 and 26. Likewise, and as shown in the drawing, other collecting elements may be employed. Thus a single tower or a battery of towers may be connected through the line 30, controlled by valve 29, to the Cottrell precipitator indicated at 31. The phosphoric acid precipitated in this element may be led off through the line 32 to the collecting or storage tank 33. Waste gases may be passed off through the line 31'.

It will be appreciated, therefore, that any suitable type of absorbent system may be employed. As an example of another modification, the absorbing towers may be by-passed, by closing the valve 22 and opening the valve 34, through the line 35 directly to the Cottrell precipitator. Similarly, in the arrangement of elements shown, the battery of absorbing towers comprising a plurality of towers represented by 23 and 26 may be used alone and the precipitator cut out. This may readily be done by closing valve 34 and providing the final tower in the battery of absorbing towers with a discharge line for the exhaust gases.

The impure phosphorus sludge which is pasesd from the container 17 to the rotary burner, as described above, is ignited so as to oxidize the phosphorus and vaporize the contained water. The impurities present in the phosphorus sludge, such as flue dust, silica, and flourine compounds, which were condensed or precipitated along with the phosphorus in the condensing system, become impregnated with phosphoric acid as the sludge is burned. Therefore, the impure phosphorus used as the charging stock for the burner yields little dust or volatile products which tend to introduce impurities into the acid and thereby decrease its commercial value. These impurities are incorporated in the residue in the burner. This residue is discharged from the rotary burner into the auxiliary combustion chamber where it may be raked out or otherwise removed from time to time. This residue may be retreated to recover phosphorus values by reintroducing it into the top of the main furnace. If desired any other suitable method of treating the residue to recover the valuable constituent may be employed.

As noted hereinbefore, the present process provides, as a by-product, a clarified non-corrosive fuel. This fuel constitutes carbon monoxide diluted with nitrogen. This gas passing out of the final condenser 13 may be led through the line 36 to the header 37 from which it may be introduced through the feed lines 38 to the hot blast stoves 39. In these stoves the fuel is utilized to preheat the air blast employed in the smelting operation. This blast is led into the stoves through suitable inlets (not shown) and after being preheated by the hot gases of combustion is discharged through the lines 43 to the air inlet line 2 which, as shown, is connected to the base of the furnace. The expended gases resulting from the combustion of the carbon monoxide pass out through the line 41 and are discharged to the atmosphere through the flue 42.

Any surplus gas not removed for preheating the air blast may be drawn off through the outlet 44 controlled by valve 45 and utilized for the generation of power or any other useful purpose.

The battery of hot blast stoves, shown in the drawing, are to be considered as representative of any suitable type of furnace system, either used directly with the blast furnace or with any other heating systems at the plant. As noted previously, this fuel is adaptable for use in practically any type of burner because of the fact that it has a high thermal value and is substantially non-corrosive and non-clogging.

It will now be appreciated that we have provided a process for producing phosphoric acid which is at once simple and economical. Not only is full utilization made of all of the valuable products, but these are so treated during the process as to eliminate all costly and unnecessary steps. By employing the process, phosphoric acid of high purity may be produced from the usual raw materials without employing any separate purification steps and without subjecting the plant equipment to any deleterious action. By the novel method of separating the solid and gaseous constituents of the furnace gases, a clean, non-corrosive fuel is produced, and by employing a separate combusition zone, relatively pure phosphoric acid may be prepared from relatively impure phosphorus. These novel results, as will be appreciated, have been achieved in part by causing certain elements to serve a plurality of useful functions. Thus, the condensing system acts not only to separate the volatilized phosphorus as a large size particle, but it also serves as a separating means to filter out fumes and entrained solids. The separate combustion stage, in addition to serving as an element for insuring the oxidation of the phosphorus, also acts as a humidifying element. This stage, in addition, insures separation of phosphorus from the undesired solid impurities.

It will be understood, therefore, that while a specific process has been described, the underlying features are susceptible of effectuation by other specific methods and by utilizing different apparatus.

The invention, therefore, is not limited to the specific disclosure, except as defined in the appended claim.

We claim:

A continuous process of producing phosphoric acid comprising charging a sintered material produced from a mixture of phosphates, siliceous material and carbonaceous fuel into a furnace having a ratio of height to crucible diameter of at least seven and one-half to one, smelting material by subjecting it to a blast of air preheated by furnace gases, driving off the elemental phosphorus, condensing the phosphorus in a plurality of stages by subjecting it to the cooling action of aqueous liquid maintained at successively lower temperatures, continuously conveying the impure wet phophorus sludge to a rotary burner, igniting the phosphorus in the presence of the aqueous liquid in the sludge and absorbing the phosphoric acid produced in a suitable absorbing system.

In testimony whereof we affix our signatures.
CHRISTOPHER G. MEMMINGER.
WILLIAM H. WAGGAMAN.
STAPLETON D. GOOCH.
FRIEDRICH P. KERSCHBAUM.